United States Patent [19]
Arnold et al.

[11] Patent Number: 5,265,241
[45] Date of Patent: Nov. 23, 1993

[54] METHOD AND APPARATUS FOR VERIFYING THE CONFIGURATION OF A LINK-CONNECTED NETWORK

[75] Inventors: Loraine Arnold, Rhinebeck; Gary A. Fisher, Sr., Port Ewen; David B. Flaxer, Accord, all of N.Y.

[73] Assignee: International Business Machines Corporation, Armonk, N.Y.

[21] Appl. No.: 577,348

[22] Filed: Sep. 4, 1990

[51] Int. Cl.⁵ .................. G06F 13/00; G06F 11/00
[52] U.S. Cl. ......................... 395/575; 395/800; 371/11.1
[58] Field of Search ........... 395/575, 700, 725, 800, 395/275; 371/11.1, 11.2, 11.3, 20.1

[56] References Cited

U.S. PATENT DOCUMENTS

| | | | |
|---|---|---|---|
| 3,768,074 | 10/1973 | Sharp et al. | 395/325 |
| 4,396,984 | 8/1983 | Videki et al. | 395/275 |
| 4,730,251 | 3/1988 | Aakre et al. | 395/325 |
| 5,014,193 | 5/1991 | Garner et al. | 395/275 |
| 5,170,472 | 12/1992 | Cwiakala et al. | 395/275 |

Primary Examiner—Paul V. Kulik
Attorney, Agent, or Firm—Floyd A. Gonzalez; William A. Kinnaman

[57] ABSTRACT

A method of creating a data structure or map describing the I/O configuration and of verifying and resolving errors in configuration data in a system in which processors are coupled to one another or to device control units either directly or through a dynamic switch by way of links attached to link adapters of respective end units. Each pair of unit link adapters coupled to the respective ends of a link exchanges information identifying the unit and the adapter on that unit. A physical configuration map indicating the actual physical system configuration is constructed from such "nearest neighbor" information. This physical configuration map is compared with a logical configuration map indicating the user-defined logical system configuration to determine the existence of any discrepancies therebetween, and one map is conformed to the other as appropriate.

16 Claims, 10 Drawing Sheets

FIG.1

PHYSICAL IDENTIFIER (OR LINK ADAPTER IDENTIFIER: LAID)

| DETERMINED ELEMENT (OR UNIT IDENTIFIER: UNITID) | DETERMINED TAG (OR ADAPTER IDENTIFIER: ADAPTERID) |
|---|---|
| | |

FIG.2

PHYSICAL DATA FROM HOST 110

| LINK | DETERMINED ELEMENT/TAG (LAID1) | ATTACHED (NEIGHBOR) ELEMENT/TAG (LAID2) |
|---|---|---|
| 101 | 110/111 | 130/131 |
| 102 | 110/112 | 140/141 |

PHYSICAL DATA FROM HOST 120

| LINK | DETERMINED ELEMENT/TAG (LAID1) | ATTACHED (NEIGHBOR) ELEMENT/TAG (LAID2) |
|---|---|---|
| 103 | 120/121 | 130/132 |
| 104 | 120/122 | 140/142 |

PHYSICAL DATA FROM SWITCH 130

| LINK | DETERMINED ELEMENT/TAG (LAID1) | ATTACHED (NEIGHBOR) ELEMENT/TAG (LAID2) |
|---|---|---|
| 101 | 130/131 | 110/111 |
| 103 | 130/132 | 120/121 |
| 105 | 130/133 | 150/151 |
| 107 | 130/134 | 160/161 |

PHYSICAL DATA FROM SWITCH 140

| LINK | DETERMINED ELEMENT/TAG (LAID1) | ATTACHED (NEIGHBOR) ELEMENT/TAG (LAID2) |
|---|---|---|
| 102 | 140/141 | 110/112 |
| 104 | 140/142 | 120/122 |
| 106 | 140/143 | 150/152 |
| 108 | 140/144 | 160/162 |

PHYSICAL DATA FROM CONTROL UNIT 150

| LINK | DETERMINED ELEMENT/TAG (LAID1) | ATTACHED (NEIGHBOR) ELEMENT/TAG (LAID2) |
|---|---|---|
| 105 | 150/151 | 130/133 |
| 106 | 150/152 | 140/143 |

PHYSICAL DATA FROM CONTROL UNIT 160

| LINK | DETERMINED ELEMENT/TAG (LAID1) | ATTACHED (NEIGHBOR) ELEMENT/TAG (LAID2) |
|---|---|---|
| 107 | 160/161 | 130/134 |
| 108 | 160/162 | 140/144 |

| DETERMINED ELEMENT | DETERMINED TAG | ATTACHED ELEMENT (NEIGHBOR) | ATTACHED TAG |
|---|---|---|---|
| HOST #1 | CHPID 02<br>CHPID 11<br>CHPID 22 | SWITCH #01<br>SWITCH #01<br>SWITCH #02 | PORT C0<br>PORT C2<br>PORT C0 |
| SWITCH #01 | PORT C0<br>PORT C2<br>PORT F2 | HOST #1<br>HOST #1<br>CONTROL UNIT #100 | CHPID 02<br>CHPID 11<br>INTERFACE B |
| SWITCH #02 | PORT C0<br>PORT C2<br>PORT F2 | HOST #1<br>—— (NULL VALUE)<br>—— (NULL VALUE) | CHPID 22<br>—— (NULL)<br>—— (NULL) |
| CONTROL UNIT #100 | INTERFACE B | SWITCH #01 | PORT F2 |

LEGEND:
— A RELATIONSHIP EXISTS BETWEEN THE TWO DATABASE ENTITIES
⊢ RELATES TO ONE AND ONLY ONE; ONE IS REQUIRED
⋲ RELATES TO ONE OR SEVERAL; ONE OR MORE IS REQUIRED
⊸ RELATES TO NONE OR ONE; ONE IS OPTIONAL
⊶⋲ RELATES TO NONE, ONE, OR SEVERAL; ONE OR MORE IS OPTIONAL

FIG.17

METHOD AND APPARATUS FOR VERIFYING THE CONFIGURATION OF A LINK-CONNECTED NETWORK

BACKGROUND OF THE INVENTION

1. Field of the Invention

This invention relates to a method and apparatus for verifying and correcting the definition of the configuration of a link-connected network, especially an input-/output (I/O) network in which host processors are coupled to peripheral device control units via switches and duplex serial fiber optic links.

2. Description of the Related Art

Input/output (I/O) systems for interconnecting processors and control units via serial fiber optic links have been previously described in the copending applications of P. J. Brown et al., Ser. No. 07/429,267, filed Oct. 30, 1989, U.S. Pat. No. 5,107,489 issued Apr. 21, 1992 for SWITCH AND ITS PROTOCOL FOR MAKING DYNAMIC CONNECTIONS, of M. C. Cox et al., Ser. No. 07/964,571 filed Oct. 21, 1992, a continuation of Ser. No. 07/444,190, filed Nov. 28, 1989, now abandoned and of A. Carusone et al., Ser. No. 07/516,387, filed Apr. 30, 1990, U.S. Pat. No. 5,167,667 issued Oct. 20, 1992 for METHODS AND APPARATUS FOR PERFORMING FAULT ISOLATION AND FAILURE ANALYSIS IN LINK-CONNECTED SYSTEMS, all of which are assigned to the owner of this application. In the system described in these applications, one or more crosspoint switches having serial fiber optic ports may be actuated to form either a static or a dynamic connection between pairs of ports to establish bidirectional communication between a processor and a control unit coupled to one or more peripheral devices such as a terminal, a printer, a direct access storage device (DASD) (e.g., a magnetic or optical disk drive), or a magnetic tape drive. In a typical installation, a first link may interconnect a processor and a switch, while a second link may interconnect the switch and a control unit to complete the connection between the processor and the control unit Each link may be several kilometers in length.

Planning and implementing the I/O configuration of a system such as the one described above can be a difficult and challenging task for the user There are two basic steps in enabling an I/O configuration: (1) the construction of a logical definition of the computing complex; and (2) the physical installation of I/O units and the cabling that interconnects these devices. Individually, each activity can be extremely complex. For example, in defining the logical I/O configuration the user must account for competing requirements and constraints when designing a plan for I/O accessibility.

Accuracy and consistency between the logical and physical I/O configuration is central to the ability to perform the full range of I/O operations, configuration management, and connectivity management which is required within the computer complex. Because of the complexity, the logical and physical I/O configurations may not match accurately. Mismatches between the two may indicate errors in the I/O configuration definition, mistakes made when the I/O units were cabled, or uninstalled or not operational I/O units. Where the mismatches result in gross errors, I/O operations may fail outright. Sometimes, these mismatches may not result in the inability to perform I/O operations and errors, but subtle problems, such as access to the incorrect I/O units, may not be detected. In other cases, I/O may be performed completely correctly, but the logical-to-physical differences can result in a degradation of configuration or connectivity management services.

SUMMARY OF THE INVENTION

In general, the present invention contemplates a method and apparatus for verifying and correcting the configuration of a system in which processors are coupled to one another or to device control units either directly or through an intermediate unit such as a dynamic switch by way of links attached to link adapters of respective end units. Each pair of unit link adapters coupled to the respective ends of a link exchanges information identifying the unit and the adapter on that unit to generate pairs of associated link adapter identifiers identifying respective links. A physical configuration map indicating the actual physical system configuration is constructed from such "nearest neighbor" information. The physical configuration map is compared with a logical configuration map indicating the user-defined logical system configuration to determine the existence of any discrepancies therebetween.

Upon the discovery of a logical-to-physical mismatch, a program may take one of several corrective recovery actions, depending on the purpose and function of the program. (The term "program" as used herein includes a software program as well as a hardware apparatus, also referred to as a "machine".) These recovery actions may include reports to the customer, requests for additional information, or other program-specific actions. For a configuration manager, the physical view of the configuration may hold a higher precedence than the logical definition, since I/O operations can only be performed on physical paths. A program or machine may therefore elect to consider the configuration described by the physical information to be a more accurate representation of the configuration, and therefore, for the purposes of the program, may conform the logical view to the physical view.

DESCRIPTION of THE PREFERRED EMBODIMENTS

Figure 1:
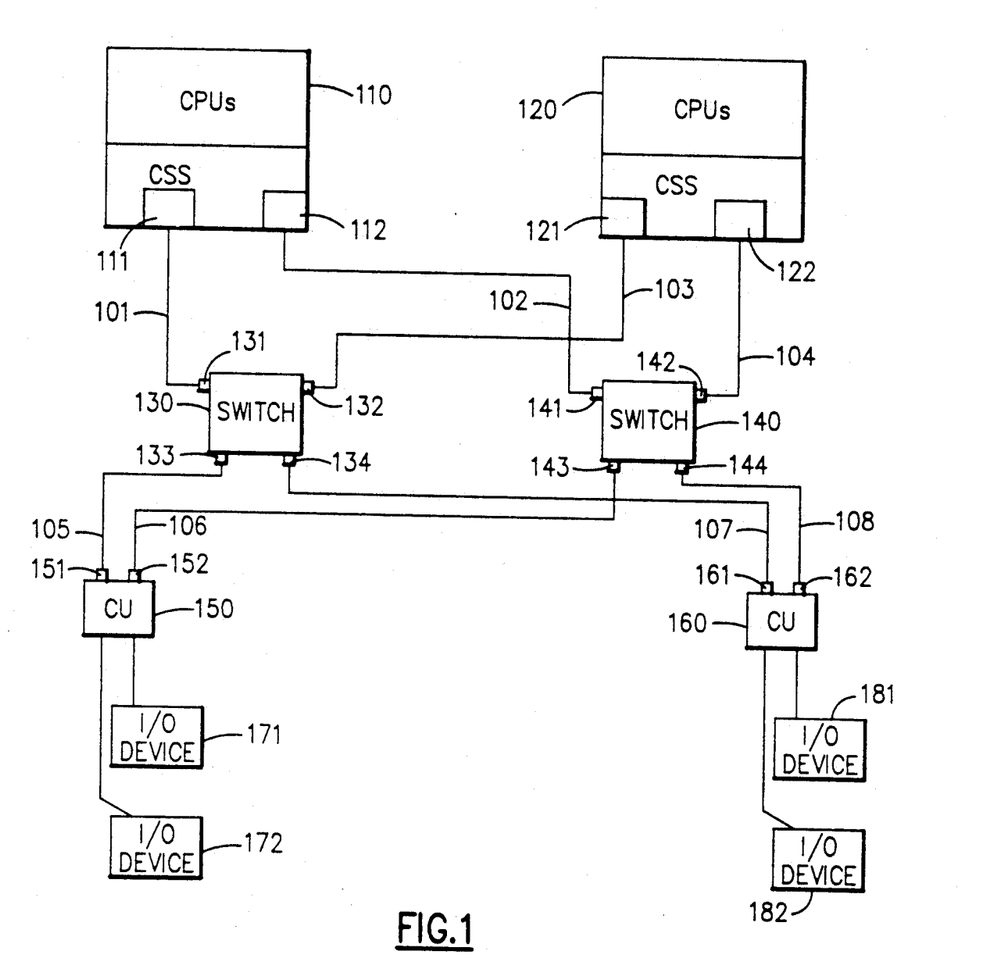
FIG. 1 is a schematic diagram of a system of serially interconnected units in which the present invention may be used.

Referring now to FIG. 1, a system in which the present invention may be used may include one or more processors 110 and 120 coupled to dynamic crosspoint switches 130 and 140 by serial fiber optic links 101, 102, 103 and 104. Each processor 110 or 120 comprises a central processing complex (CPC), with one or more central processing units (CPUs) (not separately shown), and a channel subsystem (CSS) for handling communications between the central processing complex and the other units of the system. Each processor 110 or 120 has one or more host operating systems ("hosts" hereinafter) running thereon. Although a pair of processors 110 and 120 and a pair of switches 130 and 140 are shown in FIG. 1, the particular number of units of each type is arbitrary as far as the essentials of this invention are concerned. The channel subsystem of processor 110 has a pair of link adapters 111 and 112 coupled to respective links 101 and 102, while similarly the channel subsystem of processor 120 has a pair of link adapters 121 and 122 coupled to respective links 103 and 104. Link adapters 111, 112, 121 and 122 correspond to respective I/O channels, or channel paths, of the channel subsystems of processors 110 and 120 that are identified by channel path identifiers (CHPIDs).

Link 101 couples link adapter 111 of processor 110 to a link adapter 131 of switch 130; link 102 couples link adapter 112 of processor 110 to a link adapter 141 of switch 140; link 103 couples link adapter 121 of processor 120 to a link adapter 132 of switch 130; and link 104 couples link adapter 122 of processor 120 to a link adapter 142 of switch 140. Switch link adapters 131, 132, 141, and 142 (as well as other switch link adapters to be described) correspond to respective ports or interfaces of switches 130 and 140, just as the link adapters of processors 110 and 120 correspond to respective channels (CHPIDs) of the processor channel subsystems. Each of links 101 to 104 is a duplex link containing a pair of fiber optic conductors for simultaneous bidirectional communication between the respective unit interfaces (channel and switch port) at the ends of the link.

Switches 130 and 140 are in turn coupled to control units 150 and 160 associated with peripheral devices 171-172 181-182, such as the storage devices referred to above, by duplex serial fiber optic links 105, 106, 107 and 108. Thus, link 105 couples a link adapter 133 of switch 130 to a link adapter 151 of control unit 150; link 106 couples a link adapter 143 of switch 140 to a link adapter 152 of control unit 150; link 107 couples a link adapter 134 of switch 130 to a link adapter 161 of control unit 160; and link 108 couples a link adapter 144 of switch 140 to a link adapter 162 of control unit 160. Link adapters 151, 152, 61 and 162 correspond to respective interfaces of control units 150 and 160, in a manner similar to that of the link adapters of processors 110 and 120 and switches 130 and 140 Although each of switches 130 and 140 is shown as having only four ports, they may typically have many more for attachment to other units In general, each of switches 130 and 140 has 2n ports and may be actuated make up to n duplex connections between respective pairs of ports Thus, where n is 32, switch 130 or 140 may be actuated to make up to 32 connections between respective pairs of ports, for a total of 64 pairwise connected ports.

Switches 130 and 140 are capable of two basic types of connections: static and dynamic Static connections are established between pairs of switch ports without regard to a particular message that may be passing between the ports; the ports remain connected, even though the connecting links may be inactive. A dynamic connection, on the other hand, is made for a particular communication between ports, and is broken when the communication is terminated. Although the particular protocol for making dynamic connections between switch ports does not as such form part of this invention, a preferred protocol is described in the copending application of P. J. Brown et al. referred to above, the specification of which is incorporated herein by reference.

Figure 2:
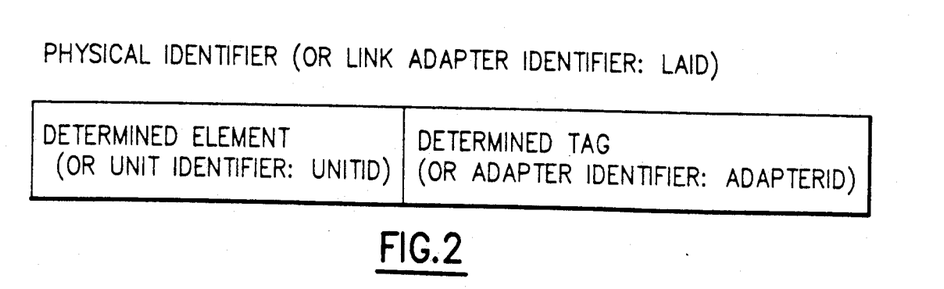
FIG. 2 is an illustration of the general format of the link adapter identifiers used in the system shown in FIG. 1.

A further description of the system shown in FIG. 1 may be found in the above-identified copending applications of M. C. Cox et al. and A. Carusone et al., the specifications of which are incorporated herein by reference. As described in the application of A. Carusone et al., each of the link adapters of processors 110 and 120, switches 130 and 140, and control units 150 and 160 has a unique two-part link adapter identifier (LAID), or physical identifier, UNITID_ADAPTERID associated therewith FIG. 2 shows the general format of the link adapter identifier The first part of the identifier (UNITID) uniquely identifies the unit, distinguishing it from other types of units as well as from other units of the same type. The second part of the identifier (ADAPTERID) identifies the particular link adapter as distinguished from other link adapters on the same unit.

Thus, in the system shown in FIG. 1, the reference numbers used to identify the link adapters also serve as possible link adapter identifiers (LAIDs). For example, the LAID for link adapter 111 on processor 110 could comprise the two-part identifier 110/111, the first part of which consists of a character string identifying the processor 110 and the second part of which consists of a tag identifying the particular channel (CHPID) to which the link adapter corresponds. Similarly, the LAID for link adapter 131 of switch 130 could comprise a two-part identifier 130/131, the first part of which identifies the switch 130 and the second part of which identifies the particular port on switch 130 to which the link adapter corresponds. The control unit LAIDs could also be derived in an analogous manner.

The use of the unit and link adapter reference numbers for the LAIDs described in the preceding paragraph is for the purpose of exposition. In an actual system, the adapter identifier part of the LAID would merely have to distinguish the adapter from other adapters in the same unit, and would not have to distinguish the adapter from those of other units.

Figure 3:
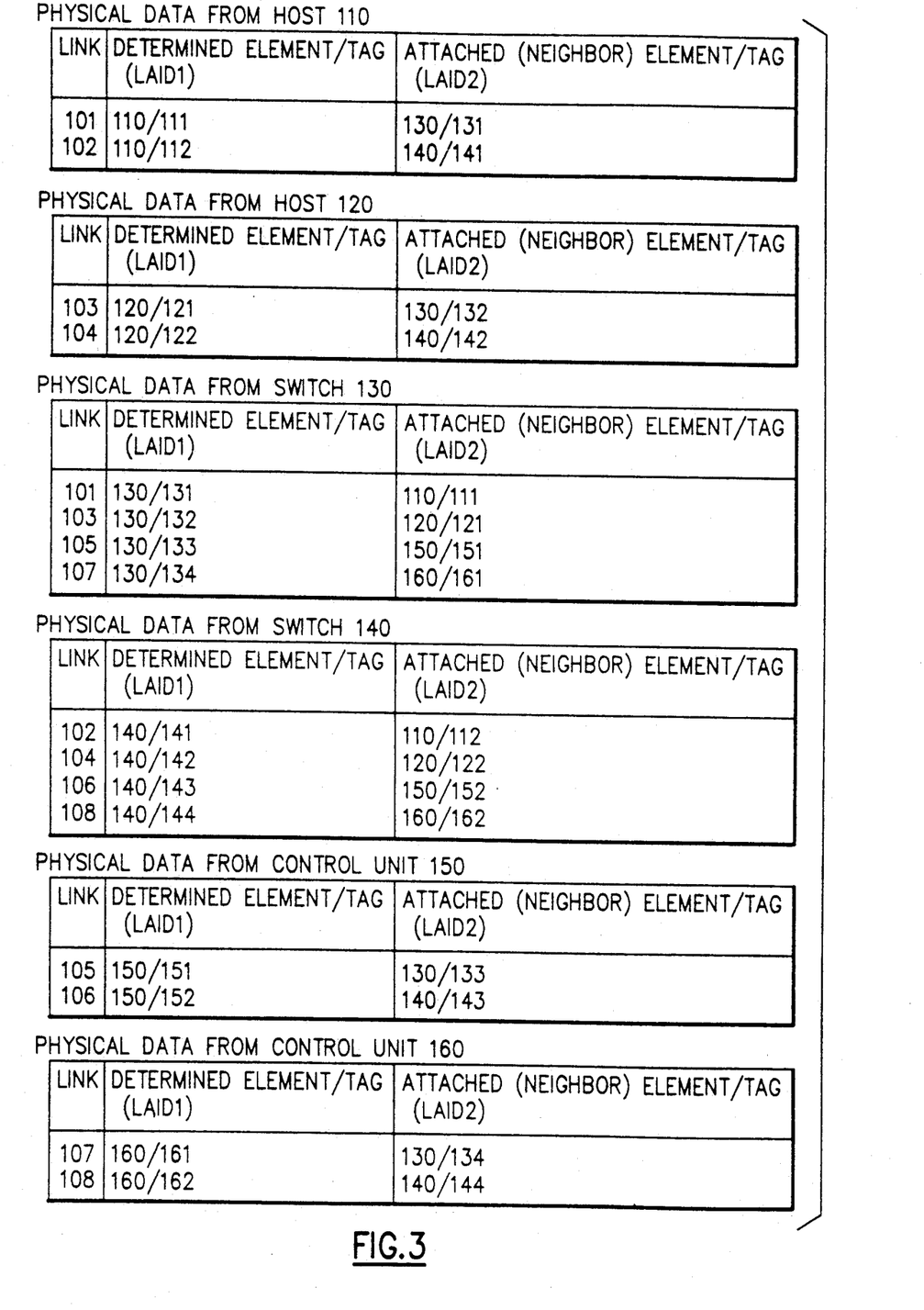
FIG. 3 is an example of a configuration map of the system shown in FIG. 1, using link adapter identifiers of the type shown in FIG. 2.

Upon system startup or at some other appropriate time such as reinitialization, each link adapter transmits its LAID over the link to the link adapter at the other end of the link Thus, considering link 101, link adapter 111 transmits its LAID 110/111 over the link to the link adapter 131 at the other end of the link, while link adapter 131 conversely transmits its LAID 130/131 over the same link to link adapter 111 This results in the generation, at each end of the link, of an associated pair of LAIDs 110/111 and 130/131 identifying the link 101. Each link adapter associates one of the pair with with its own LAID and the other of the pair with the "neighboring" LAID. The neighboring or attached LAID has the same general format as the adapter's own determined LAID (FIG. 3). The fact the the identifiers are exchanged over the link being identified assures that the LAID pairs thus generated reflect the actual physical configuration of the system. A similar two-way exchange of identifiers occurs over each of the other links 102 to 108 of the system. Although in theory a one-way transmission of identifiers would suffice for the purposes of this invention, preferably a two-way exchange of identifiers is made for redundancy and to aid in fault isolation. With such two-way exchange, each I/O unit in the configuration can build a data structure such as a table (FIG. 3) which contains entries of pairs of LAIDs for the links to which the I/O unit is physically attached.

In FIG. 3, the use of the link reference numbers is again for the purpose of exposition. The program does not identify a particular fiber optic cable as being attached to a unit; the link identity is merely the identity of the link adapters at the two ends, as indicated by the LAIDs.

Figure 4:
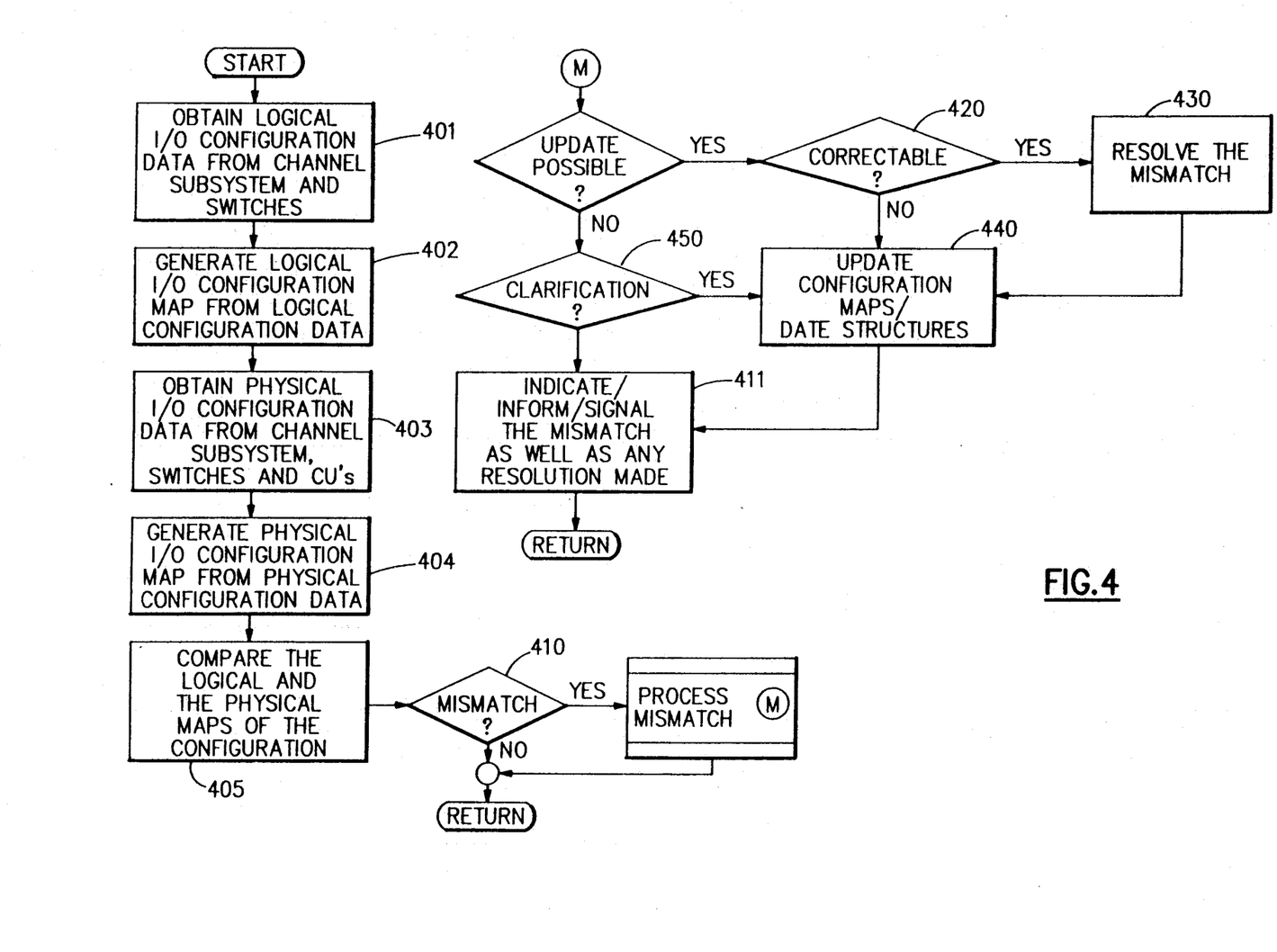
FIG. 4 is a flowchart illustrating the general sequence of steps followed to verify the configuration of the system shown in FIG. 1.

FIG. 4 shows the general sequence of steps for configuration verification which are performed by a program running on a host associated with one of processors 110 and 120 of the system shown in FIG. 1 First, the program obtains logical I/O configuration data from its channel subsystem (CSS) and attached I/O units (step 401). This information represents the user-inputted I/O configuration, which logically defines the channels, switch units, control units and devices of the system, as well as the path relationships between these I/O units This logical I/O configuration data is used to generate a logical configuration map (step 402), which may have the same data structure as the physical configuration map to be described.

The program then obtains physical I/O configuration data for its channels (CHPIDs), using channel subsystem (CSS) services; and the switches and control units to which it attached, using I/O device services (step 403). (These services may be implemented in any one of a number of ways, not relevant to this invention, and hence are not specifically described.) This physical configuration data consists of the pairs of associated link adapter identifiers described above. These generated pairs of associated LAIDs identifying the physically connected links 101 to 108, which are collected by the processor, are used to generate a physical configuration map indicating the actual configuration of the system shown in FIG. 1 (step 404).

Figure 17:
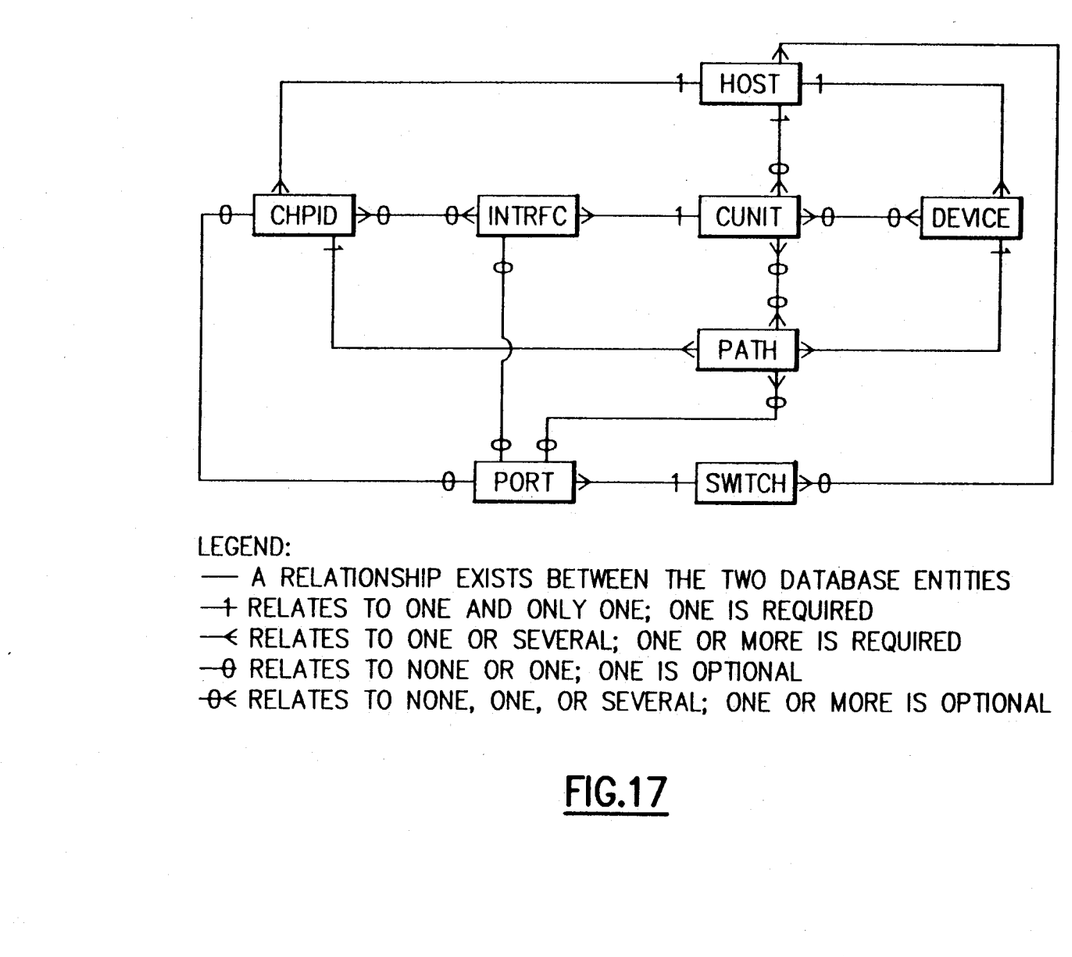
FIG. 17 depicts a data structure that may be used for the logical and physical configuration maps of the invention.

As noted above, the physical configuration map (as well as the logical configuration map referred to above) may be in the form of a table (FIG. 3), each entry of which contains a pair of associated LAIDs identifying a particular link. As shown in FIG. 3, the table may contain double entries LAID1 LAID2 and LAID2 LAID1 for each link, since these paired entries would be generated automatically by the respective adapters at the end of each link by virtue of the two-way exchange of identifiers described above. Other data structures, however, could also be used, as is apparent to those skilled in the art. Thus, FIG. 17 depicts a data structure that may be used for the logical and physical maps of the invention. The data structure is shown in an entity attribute relationship model. In the figure, the path referred to extends between a channel (CHPID) and an I/O device.

The physical configuration map thus generated is compared (step 405) with the logical configuration map, which indicates the assumed configuration of the system previously created by the user, to determine the existence of any discrepancies therebetween in their description of link attachments between I/O units (step 410). Thus, for each logically defined I/O unit interface, the program associates the physical identifiers (i.e. the LAIDs) with it that describe the interface and what it is attached to (its "neighbor"). By correlating these two configuration maps, differences between the logical and physical views can be detected.

If any such discrepancies are detected, a suitable action is taken, depending on the nature of the discrepancy. Thus, the processor may (a) report to the user the detection of the mismatch, citing a probable cause if possible (step 411); (b) correct the logical view to match the physical mapping when errors are clearly determined (step 430); (c) augment the logical view to include the physical mapping when errors are detected, but resolution cannot be achieved (440); or (d) request additional user-inputted information (450). Typically, the user may conform the logical configuration map to the physical configuration to correct what is determined to be an erroneous view of the system. On the other hand, the discrepancies may indicate problems in the actual physical configuration, which must be addressed.

Further examples of the practice of the invention are shown in FIGS. 5 to 16. Although link adapters shown in FIG. 1 are not expressly identified in the figures, they are to be understood as being present at the various interfaces depicted by the CHPIDs, ports and the like.

Figure 5:
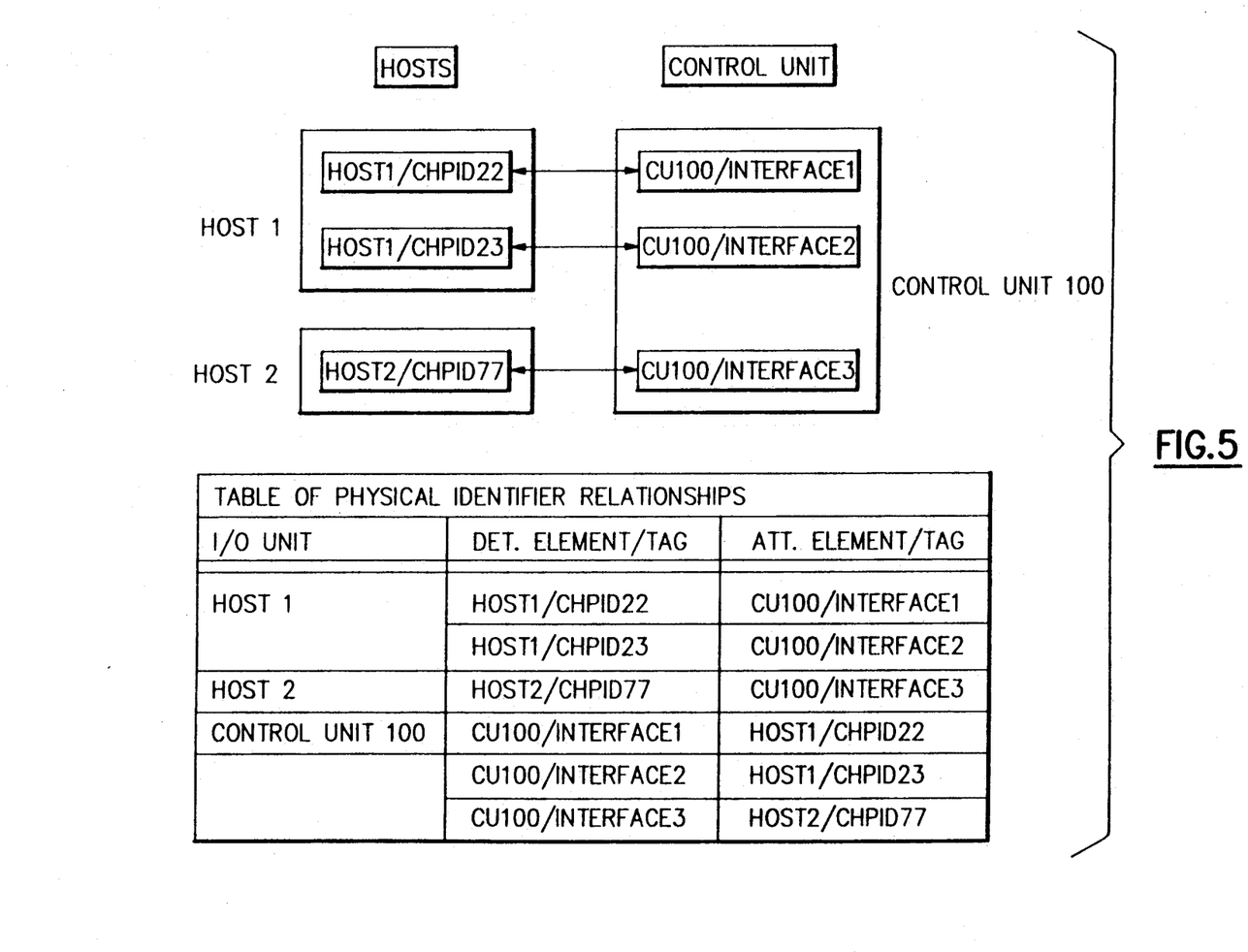
FIG. 5 shows an example of an exchange of physical identifiers between I/O units.

FIG. 5. is an example of an exchange of physical identifiers (LAIDs) between I/O units This figure shows hosts 1 and 2 with channel paths (CHPIDs) 22, 23 and 77 attached to a control unit (CU) 100 with three attachable unit interfaces. In the process of initializing basic communication capabilities between the interfaces, the physical identifiers are exchanged. The identifiers uniquely describe the I/O unit, and define the specific attachable unit interface. Using suitable means, a program can obtain the physical identifiers (its interface, and its "neighbor") from every interface of the I/O unit. The physical configuration can be mapped from the information obtained from the I/O units. Note that the physical map for any individual host may reflect other hosts' I/O resources because physical identifier information crosses host boundaries. In this way, the physical map can describe a set of I/O resources greater than that defined in the logical I/O configuration. The physical identifiers are provided as an example only.

Since I/O units may have multiple interfaces, these units may be interconnected to more than one I/O unit, and in fact may be attached to multiple hosts. This means that physical identifiers can be obtained for the set of I/O units which is greater than that defined in the user-inputted I/O configuration for a specified host. The resulting physical map may thus include more I/O units than is specified in the logical I/O configuration mag. Conversely, the logical I/O configuration may reflect I/O units which are not represented in the physical configuration map. In this case, the I/O units are logically defined, but are not available (not installed or not powered on) and the physical identifiers cannot be obtained. In these situations, the differences between the physical and logical maps may not represent I/O configuration errors, but can reveal pertinent information to the user regarding the I/O configuration. Therefore, a program may be designed to report this information to the user, and provide both the logical and physical I/O configuration mappings.

Figure 6:
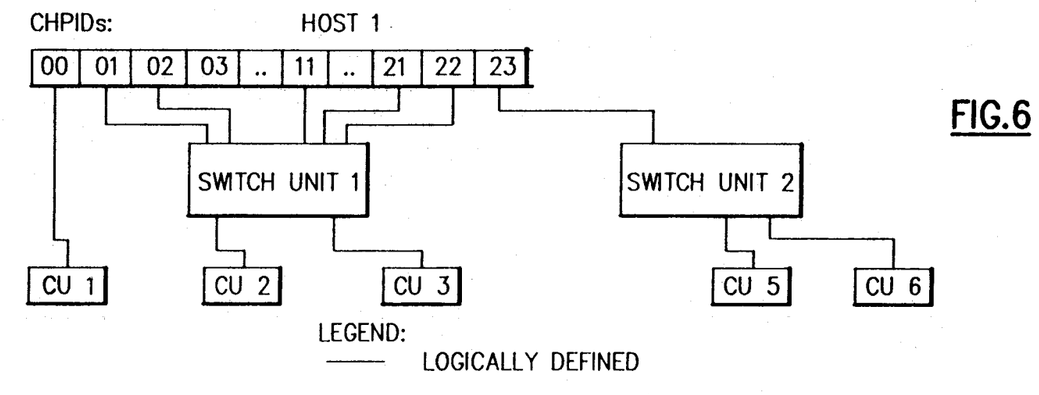
FIG. 6 is an example of a logical I/O configuration map for a host processor.

FIG. 6 is an example of a logical I/O configuration map for host 1. This figure shows the logical I/O configuration map for host 1 based on the user-defined I/O configuration. Information on eight channel paths (CHPIDs), two switching units, five generalized I/O control units, and the I/O paths between them are described. Information on the configuration is obtained using channel subsystem (CSS) services. Note that because the I/O configuration is a logical definition, there is no assurance that the I/O units exist or are operable.

Figure 7:
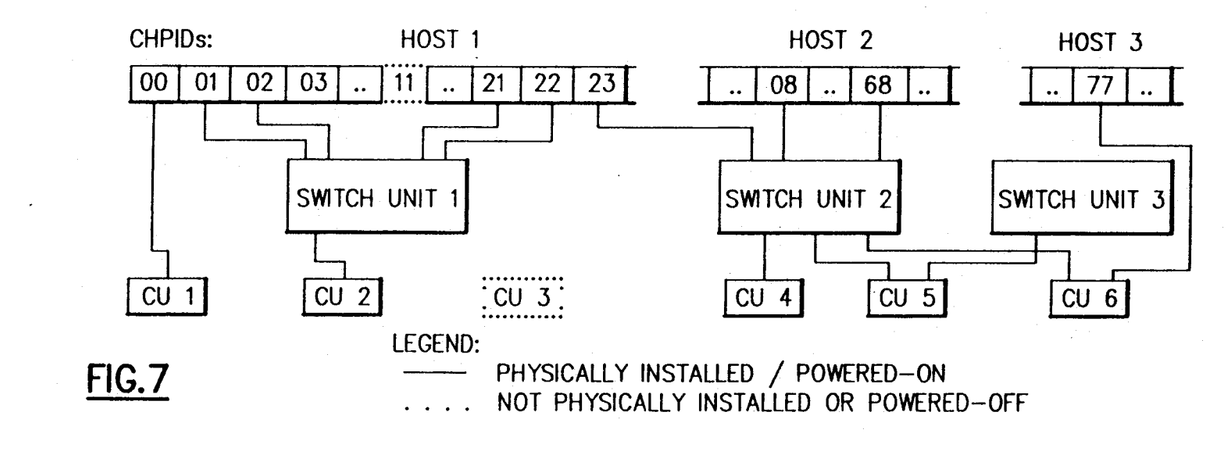
FIG. 7 is an example of the physical I/O configuration map for the host processor shown in FIG. 6.

FIG. 7 is an example of a physical I/O configuration map for host 1. This figure shows the physical I/O configuration map for host 1 based on the configuration described by the logically defined configuration in FIG. 6. Two valuable classes of configuration information are revealed in the physical map: (1) I/O units which are logically defined to the host but are not available; and (2) I/O units which are not logically defined to the host, but are physically attached to I/O units which are. Logically defined, not physically identified units include CHPID 11 and CU 3. No physical identifiers could be obtained for these I/O units, implying that the unit is not installed or not operational. Physically identified, not logically defined units include: host 2 CHPIDs 08, 68; host 3 CHPID 77, CU 4; and switch unit 3. The detection of these units is facilitated by the exchange of the physical identifiers. These identifiers are obtained by host 1 when it performs device I/O functions to the I/O units which are defined to it. Since all physically attached information is returned, regardless of the logical definition, I/O units not defined to the host are revealed From this information, the physical map is constructed.

There are several types of errors the user can make when defining or installing the I/O configuration which may not result in inability to perform I/O operations. However, these errors can lead to the mismatch of logical and physical configuration views. These errors include:

1. I/O definition errors for a channel path (CHPID) which associate it with an incorrect switching unit, associate it with a switching unit when it is not attached to one, or do not associate it to a switching unit when it is attached to one. In these error situations, control units with paths to the channel path are incorrectly associated with the wrong switching unit, associated with a switching unit when it is not attached to one, or not associated with a switching unit when it is attached to one.

2. Definition errors which associate a control unit path with an incorrect switch unit interface.

3. Cabling errors for a channel path which attach it to an incorrect switching unit, attach it to a switching unit when it is not associated with one, or do not attach it to a switching unit when it is associated with one.

4. Cabling errors which attach a control unit to an incorrect switch unit interface. These errors are described further in the following examples.

Figure 8:
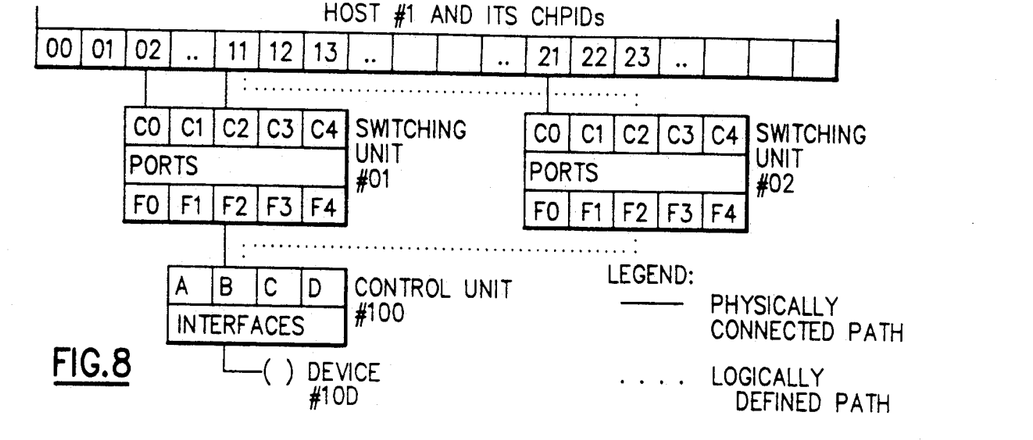
FIG. 8 shows an example of an I/O configuration definition error.

FIG. 8 is an example of an I/O configuration definition error. This figure shows a channel path identifier (CHPID) 11 that was defined to be attached to switch 02, when it is actually attached to switch 01. The control units (e.g., control unit 100) that are defined to be accessed by CHPID 11 are actually attached to switch 01, so it is the logical definition, not the physical connection, that is in error. The control units with paths to CHPID 11 are, as a consequence, associated with the ports on the incorrect switch. From the point of view of the physical path, I/O operations can be successfully performed. However, the logical view is inconsistent with the physical state of the connectivity. For a configuration manager, this mismatch exposes the possible loss of critical resources when performing configuration change operations, such as reconfiguring the switches. That is, it appears that to change access from CHPID 11, switch 02 must be changed, but any action to switch 02 will be ineffective. Also, changes to switch 01 may accidentally cut off crucial I/O through CHPID 11.

Figure 9:
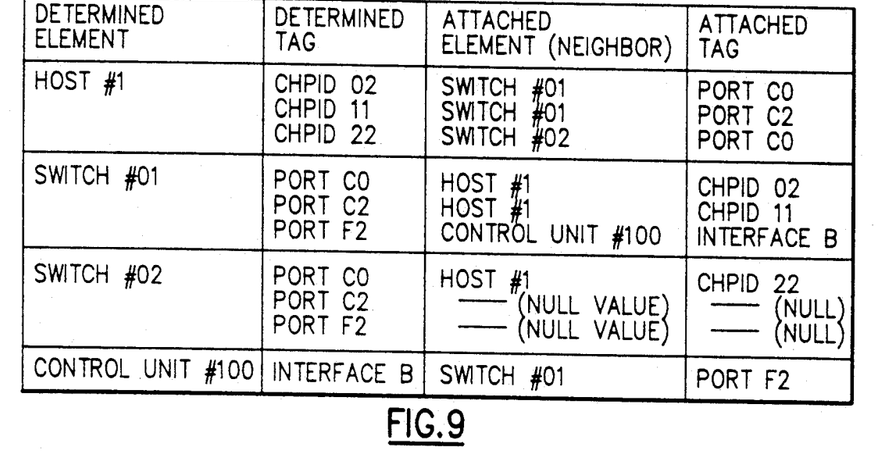
FIG. 9 is a table representing the physical configuration relationships of the system shown in FIG. 8.

FIG. 9 is a table representing the physical configuration relationships of the system illustrated in FIG. 8. Note that on switch 02, the interfaces C2 and F2 have no "neighboring" physical identifiers associated with them. Conversely, on switch 01, the interfaces C2 and F2 do have "neighboring" physical identifiers associated with them. These relationships indicate the mismatch of the logical and physical configurations, and provide a means of correcting the error.

Figure 10:
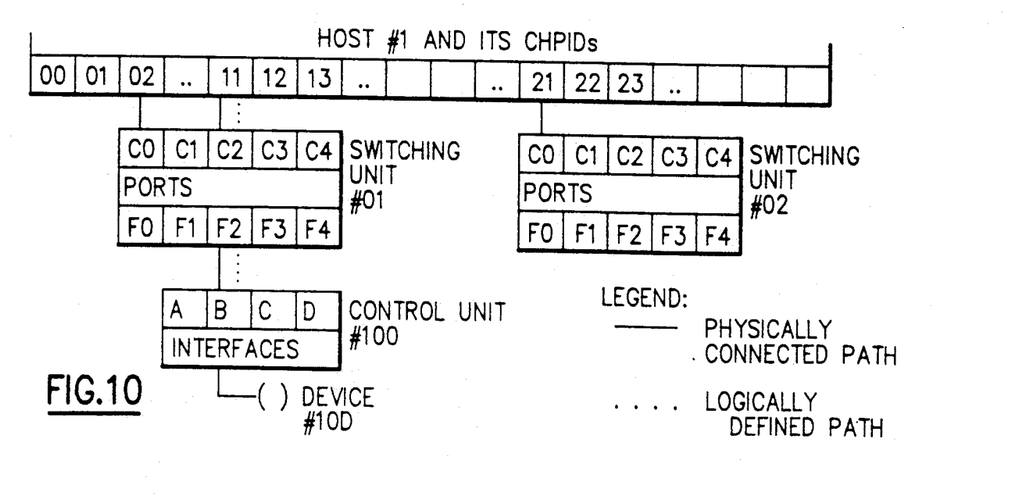
FIG. 10 is an example of the correction of the configuration error shown in FIG. 8 using physical identifiers.

FIG. 10 is an example of the correction of the configuration error shown in FIG. 8 using the physical identifiers shown in FIG. 9. The physical identifiers indicate that CHPID 11 is connected to port C2 on switching unit 01, and is not attached to switching unit 02. This condition represents an I/O configuration definition error. This can be further verified if CHPID 02, CHPID 11 and CHPID 22 are defined to access control unit 100 on port F2. CHPID . 02 and CHPID 11 will be able to access the control unit, while CHPID 22 will not. Since I/O operations can be successfully performed on the physically paths, the program's logical view of the configuration is dynamically altered to match the physical mapping. For the configuration manager, this correction can ensure configuration changes without the accidental loss of critical resource.

Figure 11:
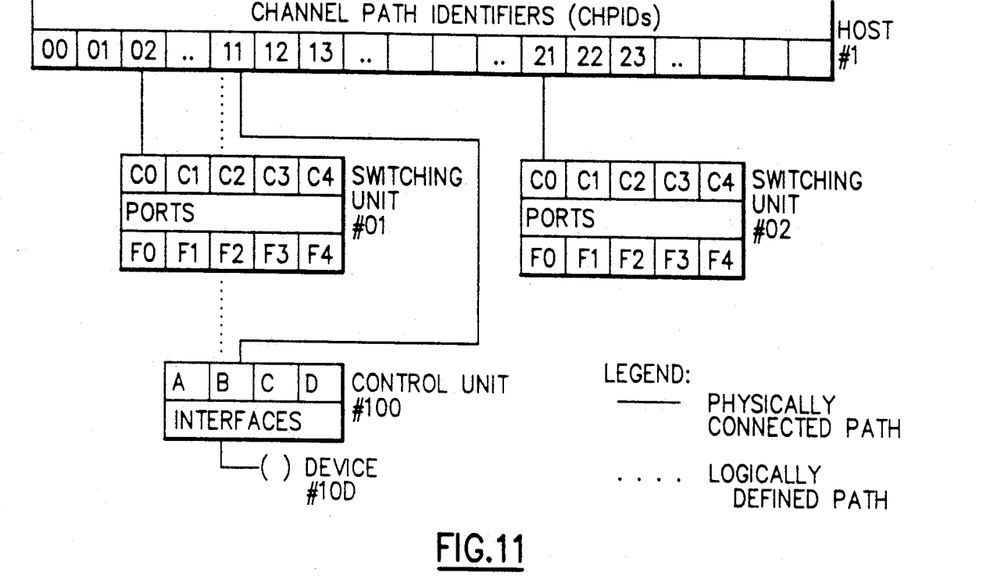
FIG. 11 is another example of an I/O configuration definition error.

FIG. 11 is another example of an I/O configuration definition error. This figure shows a channel path identifier (CHPID) 11 that was defined to be attached to switch 01, when it is actually directly attached to control unit 100. The control unit that is defined to be accessed by CHPID 11 is actually attached to CHPID 11, so it is the logical definition, not the physical connection, that is in error. The control unit 100 with a path to CHPID 11 is, as a consequence of the error, associated with port F2 on switch 01. From the point of view of the physical path, I/O operations can be successfully performed. However, the logical view is inconsistent with the physical state of the connectivity. This mismatch is only a definition error, which may cause confusion to a user, but not an accidental critical loss of resource.

Figure 12:
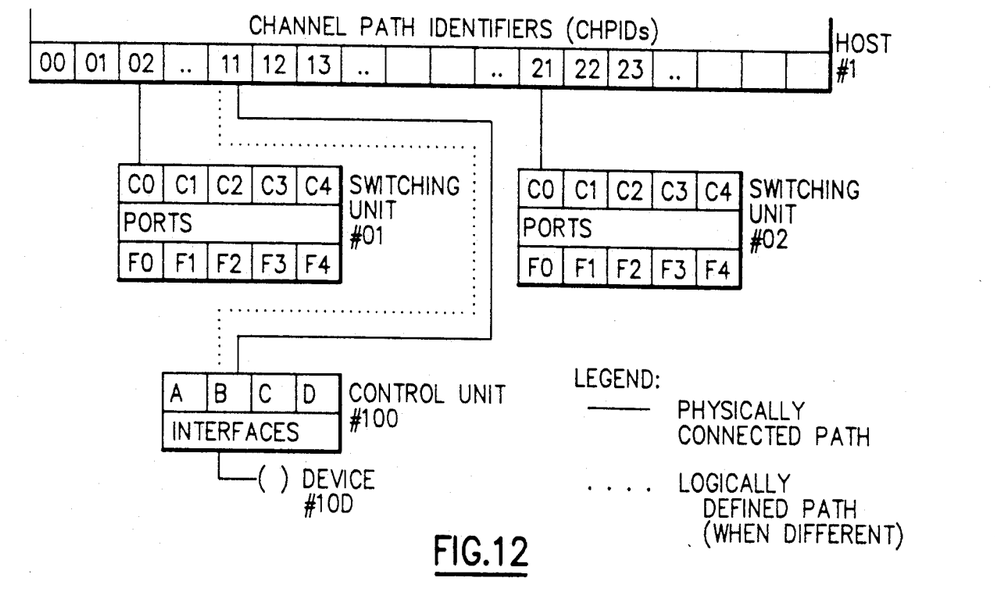
FIG. 12 is an example of the correction of the I/O configuration definition error shown in FIG. 11.

FIG. 12 is an example of the correction of the I/O configuration definition error shown in FIG. 11. This figure shows a channel path identifier (CHPID) 11 that was defined to be attached to switch 01, when it is actually directly attached to control unit 100, after the correction to remove the association from the switch. By building a physical connectivity map from the physical identifiers, it can be determined that the CHPID is not on a switch, but is directly attached to the control unit. The control unit 100 with a path to CHPID 11 is, as a consequence of the correction, no longer associated with a port on switch 01.

Figure 13:
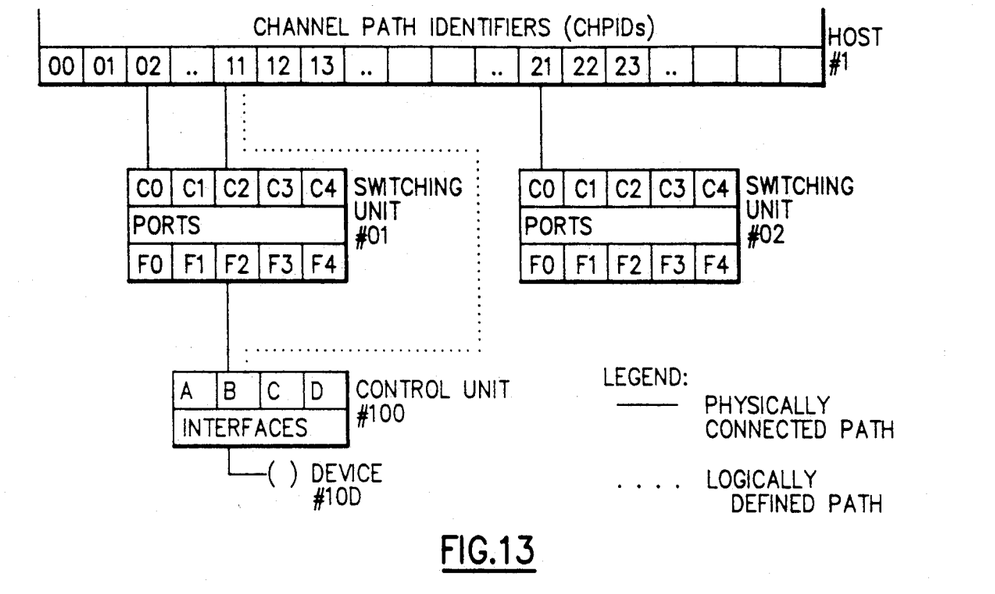
FIG. 13 is yet another example of an I/O configuration definition error.

FIG. 13 is yet another example of an I/O configuration definition error. This figure shows a channel path identifier (CHPID) 11 that was defined to be directly attached to control unit 100 (i.e., not be attached to a switch), when it is actually attached to switch 01. The control unit 100 that is defined to be accessed by CHPID 11 is actually attached to switch 01, so it is the logical definition, not the physical connection, that is in error. The control unit 100 with a path to CHPID 11 is, as a consequence of the configuration definition error, not associated logically with a port on switch 01. From the point of view of the physical path, I/O operations can be successfully performed. However, the logical view is inconsistent with the physical state of the connectivity. For a configuration manager, this mismatch exposes the possible loss of critical resources when performing configuration change operations, such as reconfiguring the switches. That is, changes to switch 01 may accidentally cut off crucial I/O through CHPID 11, since the CHPID is logically defined not to be on that switch.

Figure 14:
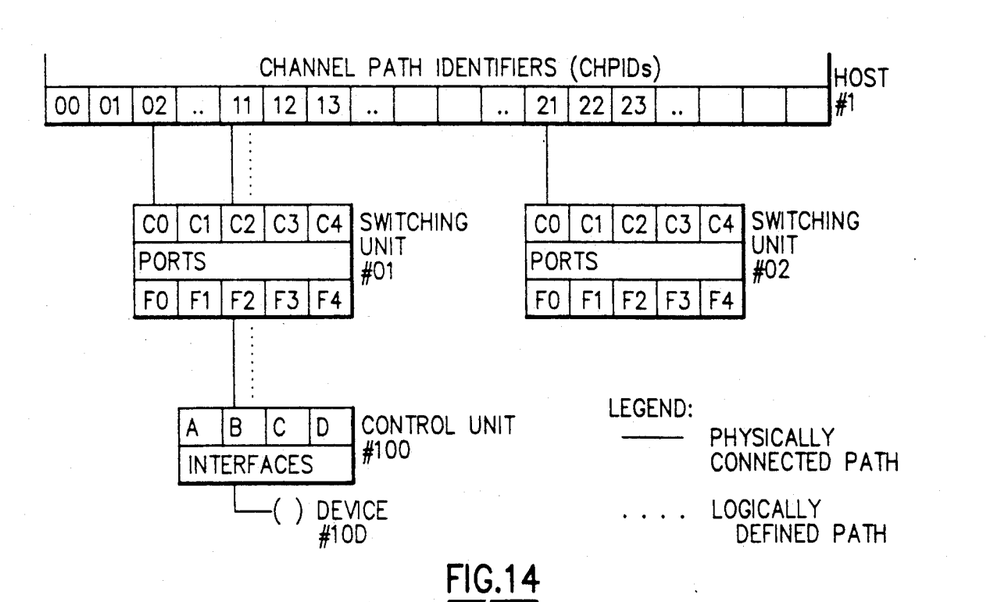
FIG. 14 is an example of a correction of the I/O configuration definition error shown in FIG. 13.

FIG. 14 is an example of the correction of the I/O configuration definition error shown in FIG. 13. This figure shows a channel path identifier (CHPID) 11 that was defined to be directly attached to a control unit (i.e., not be attached to a switch), when it is actually attached to switch 01 after the logical definition is corrected to match the physically determined configuration. Using the physical identifiers, it can be determined that the CHPID is actually on switch 01, attached to port C2. The control unit with a path to CHPID 11 is, as a consequence, now associated with the ports on a switch.

Figure 15:
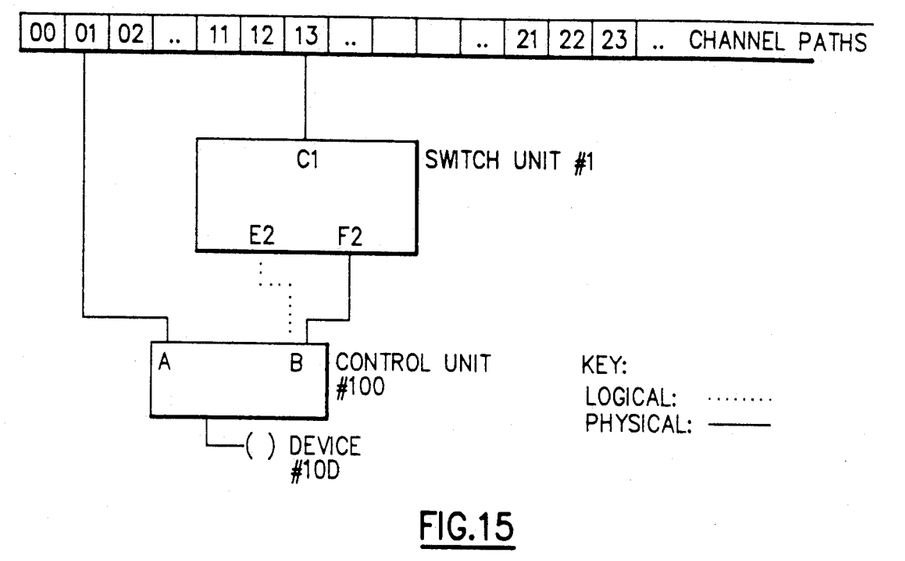
FIG. 15 is an example of an I/O configuration error involving the control unit-to-switch interface.

FIG. 15 is an example of an I/O configuration involving the control unit-to-switch interface. This figure shows control unit 100, interface B to be logically associated to interface E2 on switch 1. but is physically attached to interface F2. This can occur if there is an error in the I/O configuration definition, or if the I/O units were cabled incorrectly. In this figure, the path through interface E2 to device 101 cannot become operational because there is no physical I/O unit attached to the interface. If a similar type control unit were attached to interface E2, a potential exists for I/O to be performed to the wrong device in error. Note that CU 100 has a second path directly from CHPID 1 to interface A.

Figure 16:
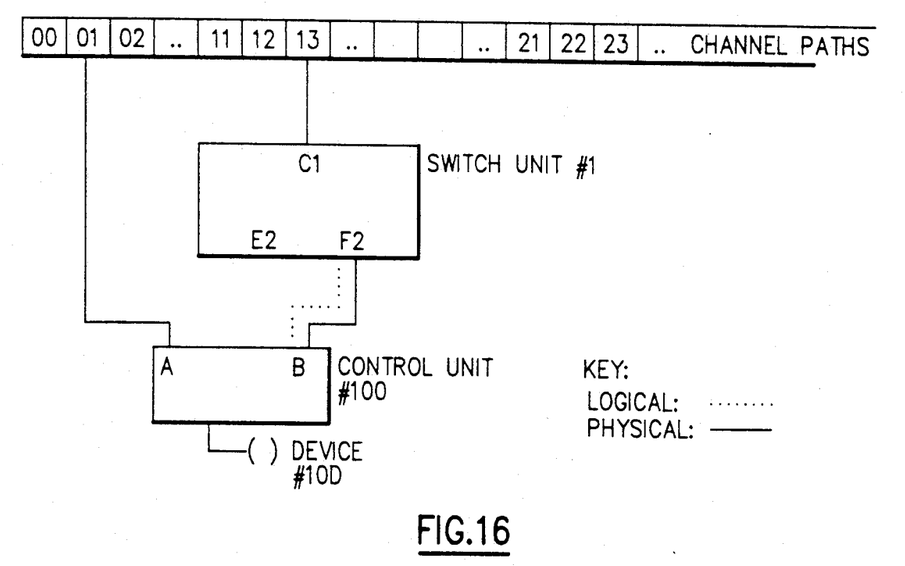
FIG. 16 is an example of a correction of the I/O configuration error shown in FIG. 15.

FIG. 16 is an example of the correction of the I/O configuration error involving the control unit-to-switch interface shown in FIG. 15. The logical association of control unit 100 interface B has been altered to reflect the physical attachment to switch 1, interface F2. This determination is made possible by the detection of a mismatch between the logical I/O and physical configuration maps. Physical identifiers associated with control unit 100 are obtained by invoking device I/O services, using the path from CHPID 01 to the control unit interface A. Although the logical and physical maps are now in agreement, I/O will not be enabled through interface B; this will require either a I/O configuration definition change, or a cabling modification. However, as a result of the detection of the configuration mismatch, a program or machine can identify the specific problem, notifying the user of the probable cause.

What is claimed is:

1. In a network of units interconnected by links, each link coupling a pair of units via respective link adapters associated with said units, each of said link adapters having a unique identifier associated therewith, a method of verifying the configuration of said network including the steps of:

(a) generating a logical configuration map indicating an assumed configuration of said network, each link in said assumed configuration identified by a pair of logical link adapter identifiers;
   (b) for each of said links, transmitting the identifier associated with the link adapter at one end of the link over said link to the link adapter at the other end of the link to generate an associated pair of link adapter identifiers identifying the link;
   (c) generating from said associated pairs of link adapter identifiers, a data structure for storing said associated pairs of link adapter identifiers, thereby providing a physical configuration map indicating the actual configuration of said network; and
   (d) comparing the logical link adapter identifiers of said logical configuration map with the link adapter identifiers stored in said data structure of said physical configuration map to determine the existence of any discrepancies therebetween.

2. A method as in claim 1 including the step of generating an observable indication of the existence of a discrepancy between said logical configuration map and said physical configuration map.

3. A method as in claim 1 including the step of generating an observable indication of the nature of a discrepancy between said logical configuration map and said physical configuration map.

4. A method as in claim 1 including the step of conforming one of said configuration maps to the other of said configuration maps.

5. A method as in claim 1 including the step of conforming said logical configuration map to said physical configuration map.

6. A method as in claim 1 in which each of said link adapter identifiers has a first portion identifying the unit and a second portion identifying the link adapter of that unit.

7. A method as in claim 1 in which the identifier associated with the link adapter at said other end of a link is transmitted to the adapter at said one end of the link.

8. A method as in claim 1 in which said network includes at least one processor unit coupled to a device control unit via a switching unit, said processor unit and said switching unit and said switching unit and said control unit being interconnected by respective links.

9. In a network of units interconnected by links, each link coupling a pair of units via respective link adapters associated with said units, each of said link adapters having a unique identifier associated therewith, apparatus for verifying the configuration of said network comprising:

(a) means for generating a logical configuration map indicating an assumed configuration of said network, each link in said assumed configuration identified by a pair of logical link adapter identifiers;

(b) means associated with each of said links for transmitting the identifier associated with the link adapter at one end of the link over said link to the link adapter at the other end of the link to generate an associated pair of link adapter identifiers identifying the link;

(c) means for generating from said associated pairs of link adapter identifiers, a data structure storing said associated pairs of link adapter identifiers, thereby providing a physical configuration map indicating the actual configuration of said network; and (d) means for comparing the logical link adapter identifiers of said logical configuration map with the link adapter identifiers stored in said data structure of said physical configuration map to determine the existence of any discrepancies therebetween.

10. Apparatus as in claim 9 including means for generating an observable indication of the existence of a discrepancy between said logical configuration map and said physical configuration map.

11. Apparatus as in claim 9 including means for generating an observable indication of the nature of a discrepancy between said logical configuration map and said physical configuration map.

12. Apparatus as in claim 9 including means for conforming one of said configuration maps to the other of said configuration maps.

13. Apparatus as in claim 9 including means for conforming said logical configuration map to said physical configuration map.

14. Apparatus as in claim 9 in which each of said link adapter identifiers has a first portion identifying the unit and a second portion identifying the link adapter of that unit.

15. Apparatus as in claim 9 in which the identifier associated with the link adapter at said other end of a link is transmitted to the adapter at said one end of the link.

16. Apparatus as in claim 9 in which said network includes at least one processor unit coupled to a device control unit via a switching unit, said processor unit and said switching unit and said switching unit and said control unit being interconnected by respective links.

* * * * *